United States Patent [19]

Gibbs et al.

[11] 4,071,831

[45] Jan. 31, 1978

[54] AMPLIFYING CHARACTERISTICS OF A CAVITY-ENCLOSED NONLINEAR MEDIUM

[75] Inventors: Hyatt McDonald Gibbs, Warren; Samuel Leverte McCall, Jr., Gillette; Thirumalai Nallan Chakravarthy Venkatesan, New Providence, all of N.J.

[73] Assignee: Bell Telephone Laboratories, Incorporated, Murray Hill, N.J.

[21] Appl. No.: 711,421

[22] Filed: Aug. 3, 1976

Related U.S. Application Data

[62] Division of Ser. No. 563,122, March 28, 1975, Pat. No. 4,012,699.

[51] Int. Cl.² .................... H01S 3/10; G02F 1/28
[52] U.S. Cl. .................................. 330/4.3; 330/4.5; 332/7.51; 350/160 R
[58] Field of Search ............ 330/4.3, 4.5; 332/7.51; 350/160 R; 307/88.3, 312

[56] References Cited

U.S. PATENT DOCUMENTS

| 3,610,731 | 10/1971 | Seidel | 350/160 |
|---|---|---|---|
| 3,813,605 | 5/1974 | Szoke | 330/4.3 |

OTHER PUBLICATIONS

McCall, "Instabilities in GW Light Propagation in absorbing Media", Apr. 1974, pp. 1515-1523, Phys. Rev. A, vol. 9, #4.
Szoke, "Bistable Optical Element and Its Applications", Dec. 1969, pp. 376-379, A.P.L., vol. 15 #11.
Hapf, "Influence of Degeneracy . . . Broadened Attenuator", Apr. 1970, Phys. Rev. B, vol. 1, #7.

*Primary Examiner*—Nelson Moskowitz
*Attorney, Agent, or Firm*—Samuel H. Dworetsky

[57] ABSTRACT

A device is disclosed which is capable of amplifying optical signals. The absorptive and dispersive properties of a cavity-enclosed nonlinear medium are combined with the transmission properties of the cavity to yield an input-output characteristic curve that displays gain or bistability.

24 Claims, 7 Drawing Figures

AMPLIFYING CHARACTERISTICS OF A CAVITY-ENCLOSED NONLINEAR MEDIUM

This application is a division of application Ser. No. 563,122 filed Mar. 28, 1975 now U.S. Pat. No. 4,012,699.

BACKGROUND OF THE INVENTION

Field of the Invention

This invention is a device that amplifies optical signals without any intermediate transformation of the optical signal into an electronic signal. In the device the characteristics of a nonlinear medium are controlled in such a way that when combined with the transmission characteristics of the cavity amplification of the optical signal results.

Background of the Prior Art

The development of the laser has influenced many areas of technology and in some has provided for devices far beyond the ken of the original pioneers in this field. So, for example, the laser has established a significant role in fields as diverse as medicine, civil engineering, semiconductor device fabrication, various manufacturing processes and of course general research and development. One major application, predicted by early workers in the field of laser technology, is still in a period of dynamic growth. This application involves the use of lasers in the field of communication. Although the obvious advantages of such an application in terms of greater bandwidth are widely recognized, problems of transmission and signal processing are formidable. In the field of transmission the development of optical fibers appears to have been a significant step along the road to effective transmission of optical signals. In the area of signal processing, some direct processing of optical signals through the use of nonlinear materials has been realized, and solid state lasers will, in all probability, be useful as miniature light sources in future communications systems. However, the ultimate step to completely integrated optical circuitry has yet to be fully realized. Such integrated optics, comparable in scale and function to integrated electronic circuitry, would enable the engineer to work with optical signals in much the same way as one works with electrical signals today. Transformation of the optical signal to an electronic signal would occur only at the extreme terminals of the communication system, if at all. All amplifying and switching operations would occur with the signal in its optical form without intermediate electronic devices. The realization of completely integrated optical circuitry has been delayed for lack of a vaible optical amplifier-a device akin to a transistor but which would not require any intermediate electronic devices. This application discloses such an optical amplifier.

Description of the Prior Art

The inventive device utilizes the transmission characteristics of a nonlinear medium. These characteristics have been found by applicants to be controllable in such a way that a region of amplification is obtained.

Specific characteristics of nonlinear absorbers have long been known. Generally, light impinging on a linear absorptive medium will diminish in strength as it passes through the medium according to the formula $$I_L = I_0 e^{-\beta L} \tag{1}$$

Here $I_O$ is the initial beam intensity, $I_L$ is the intensity at any distance L in the medium and $\beta$ is the absorption coefficient, embodying the absorption characteristics of the medium. $\beta$ is a known function of the impinging beam wavelength, for a given medium, and displays large increases in the region of ground state transitions. So for example, in the case of a gas the absorption is very strong at a wavelength that connects one of the ground states with an excited state.

Despite the strong absorption of the impinging beam in the region of a transition, it has been found that as the beam intensity is increased a region is found where the absorbed energy approaches a maximum. This occurs when the intensity of the beam is sufficiently high to "excite" approximately half of the atoms to the upper state. At equalibrium this is the largest number of atoms allowed in the upper state at any given time. Under these circumstances any additional light impinging on the gas will not be absorbed. The medium is then said to be bleached or saturated. It has been previously shown that the transmission characteristics of a resonant optical cavity may be significantly altered when filled with such a saturable absorber. A simple heuristic argument will serve to demonstrate this fact.

An empty resonant optical cavity consists of two plane mirros of high reflectivity placed at a distance L from one another. When light of intensity $I_O$ impinges perpendicularly on one mirror an amount $I_OT$ is transmitted into the cavity. Here T is the transmission of the appropriate mirror and is generally less than one. Once inside the cavity the light is reflected back and forth between the mirrors, some light being transmitted through the mirrors on each pass. If the distance between the mirrors is a multiple of one-half of the optical wavelength, then the cavity is said to be in resonance with the light, which light is then transmitted with little loss. This transmission is due to constructive interference of the light, associated with each of the passes at the mirror surfaces. When this condition obtains, the intensity within the cavity is approximately $$I_C = I_T/T \tag{2}$$

Here $I_C$ is the intracavity intensity and $I_T$ is the transmitted intensity. Since at resonance $$I_T = I_O \tag{3}$$

we obtain $$I_C = I_O/T > I \tag{4}$$

The light intensity within the cavity is greater than that incident on the cavity because of the multiple intracavity reflections.

Now consider the cavity to be filled with a saturable absorber which saturates when irradiated with light of intensity $I_S$. When light of intensity $I_O$ impinges at right angles to one of the plates of the cavity the intensity transmitted into the cavity, $$I_{TC} = I_O T \tag{5}$$

decays exponentially with distance according to Equation 1. As a result of this decay very little energy reaches the second mirror and efficient multiple reflections do not occur. If, however, the power transmitted into the cavity, $I_{TC}$, is equal to $I_S$ $$I_{TC} = I_S \quad (6)$$

then the power entering the cavity is sufficiently high to saturate the absorber and any additional light will pass through the medium as though it were not there. Under these conditions, the cavity is said to be switched on. It is then clear from Eqs. 5 and 6 that the incident intensity which will turn the cavity on is given by $$I_{O\ TURN\ ON} = I_S/T \quad (7)$$

Now consider that the cavity is turned on and that the incident intensity is lowered. We want to observe the intensity at which the cavity turns off. It is obvious from our prior discussion that the medium will cease to be transmitting when the internal cavity intensity goes below $I_S$. The internal cavity intensity, however, is given by equation 4

$$I_C = I_O/T$$

The turn-off condition then becomes $$I_C = I_S = I_O/T \quad (8)$$

$$I_{O\ TURN\ OFF} = I_S T \quad (9)$$

When the impinging intensity becomes less than $I_S T$ the cavity will turn off. While the above arguement is only qualitative, comparing Equation 7 with Equation 9 demonstrates that, since T is less than 1, the incident intensity at which the cavity turns on is greater than the intensity at which the cavity turns off. Consequently, while the power within the cavity may be related in a single valued way to the transmitted power, the relationship between the input power and the cavity power, and hence that between input and output power is dual valued.

This bistability was first disclosed by H. Seidel in U.S. Pat. No. 3,610,731 and was applied by A. Szoke in U.S. Pat. No. 3,813,605 to the production of short optical pulses with variable lengths. Szoke also describes in his disclosure applications similar to square wave amplification, inversion, and triggering. However, there is no indication in the prior art that this device can be operated in other than an absorptive bistable mode. Applicants have discovered that under certain operating conditions a primarily dispersive bistable device is realized. Since applicants' bistable device is primarily dispersive it displays significantly less loss than the absorptive bistable device. The instant applicants have also determined that under certain operating conditions the region of bistability degenerates into a single valued relationship with diferential gain. A new device for amplifying light signals is then realized. This device arises from an improved understanding of the transmission characteristic of a resonant cavity filled with a nonlinear medium. The essential elements of this improved model are described below.

THE INVENTION

Brief Description of the Invention

The invention is a device for amplifying optical signals without the intervention of electronic amplifiers. Applicants have discovered that the absorptive and dispersive characteristics of a nonlinear medium can be combined with the transmission characteristics of a resonant cavity to yield an input - output characteristic curve which displays gain. In addition, the medium and cavity characteristics can be combined to yield a region of primarily dispersive bistability.

BRIEF DESCRIPTION OF THE DRAWINGS

The invention is described in detail below with reference to the following drawings.

DETAILED DESCRIPTION OF THE INVENTION

Figure 1:
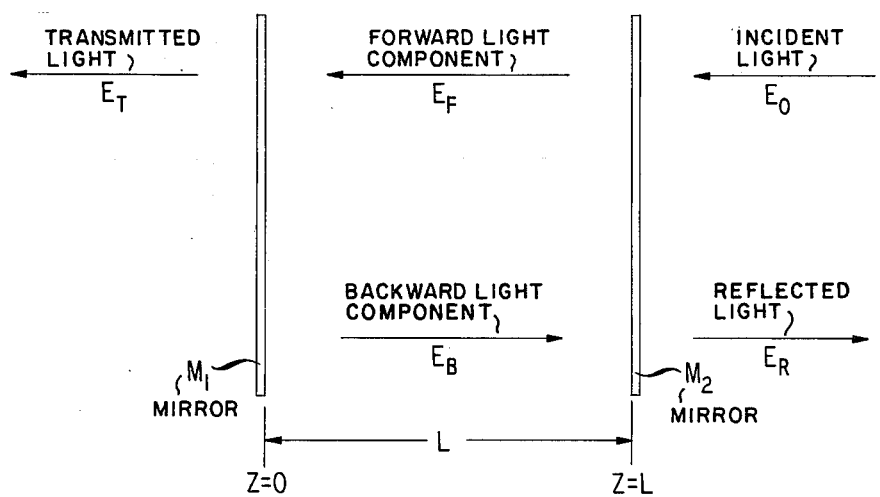
FIG. 1 is a schematic representation of an optical cavity.

Consider an empty cavity, as shown in FIG. 1, consisting of the two reflecting surfaces $M_1$ and $M_2$ each of transmission T and reflectively R, and separated by a distance L. While the reflecting surfaces can be mirrors or gratings we refer to them as mirrors. We consider the mirrors to be lossless and hence R and T sum to unity. The cavity is resonant for light of wavelength $\lambda$ incident at an angle of 90° when $$L = (m\lambda/2) + k \quad (10)$$

where $m$ is any integer, and $k$ is a constant that depends on the material nature of the mirrors. In all of the following discussion the cavity may be a Fabry-Perot cavity. $E_O$ is the input field associated with the incident light, $E_R$ is the reflected field outside the cavity, $E_T$ is the transmitted field, and $E_F$ and $E_B$ are the forward and backward field within the cavity respectively. Then from the definition of transmission and reflectivity we have at $Z = 0$ $$E_T = \sqrt{T} E_F \quad (11)$$

$$E_B = \sqrt{R} E_F \quad (12)$$

At $Z = L$ the following condition applies $$\begin{pmatrix} E_F \\ E_R \end{pmatrix} = \begin{pmatrix} \sqrt{T} & \sqrt{R}\, e^{i\Phi} \\ -\sqrt{R}\, e^{-i\Phi} & \sqrt{T} \end{pmatrix} \begin{pmatrix} E_o \\ E_B \end{pmatrix} \quad (13)$$

Here $e^{i\Phi}$ is a phase factor attributed to the traversal of the waves associated with the electromagnetic fields through the cavity.

$$\Phi = (L/\lambda) 4\pi \text{ (MODULO } 2\pi) \quad (14)$$

Since initially we consider the cavity empty the intracavity fields are not diminished during their traversal of the cavity.

We now proceed to calculate the input field $E_o$ in terms of the transmitted field $E_T$. From equation 13

$$E_F = \sqrt{T} E_o + \sqrt{R}\, e^{i\Phi} E_B \quad (15)$$

Hence $$E_o = \frac{E_F - \sqrt{R}\, e^{i\Phi} E_B}{\sqrt{T}}. \tag{16}$$

However, from equations 11 and 12, at $Z = 0$ $$E_B = \sqrt{\frac{R}{T}}\, E_T \tag{17}$$

Since there is no medium in the cavity $$E_B\Big|_{Z=L} = E_B\Big|_{Z=O} \tag{18}$$

and hence the value for $E_B$ derived in equation 17 may be substituted into equation 16. If, in addition, and with the same justification, we substitute the value of $E_F$ from equation 11 into equation 16 we obtain $$E_o = \frac{1 - R e^{i\Phi}}{T} E_T \tag{19}$$

When the cavity is tuned to resonance
$$e^{i\Phi} = 1 \tag{20}$$

and hence from equation 19 we get $$E_o = E_T \text{(at resonance)} \tag{21}$$

This is the simple resonant condition of 100 percent transmission and indicates the validity of our model.

Now consider the cavity to be filled with a nonlinear medium, for example a saturable absorber. For the purposes of this discussion we approximate the actual cavity conditions by assuming that the medium is optically thin and that absorption occurs only in $E_B$. The boundary conditions contained in equations 11, 12 and 13 are equally valid for the cavity containing an absorbing medium. Hence at $Z = L$ $$E_o(L) = \frac{E_F(L) - \sqrt{R e^{i\Phi}}\, E_B(L)}{\sqrt{T}}. \tag{22}$$

and from equations 2 and 3

$$E_F(o) = \frac{E_T}{\sqrt{T}} \tag{23}$$

$$E_B(o) = \sqrt{\frac{R}{T}}\, E_T$$

As a result of our approximation that the absorption within the cavity affects only $E_B$ we may write $$E_F(o) = E_F(L) \tag{24}$$

$E_B$ on the other hand is affected by the cavity medium, a condition which we express by $$E_B(L) = E_B(o) - G'\nu \tag{25}$$

Here $G'\nu$ is the change in field due to its interaction with the medium and equation 25 describes the resultant diminution in $E_B$ as the associated wave traverses the cavity. Note that $G'\nu$ is itself dependent on the field amplitude. Combining equations 22–25 we obtain $$E_o = E_T(1 - R e^{i\Phi}/T) + G e^{i\Phi}\nu \tag{26}$$

Here $$G = (R/T)\, G' \tag{27}$$

If in accordance with our assumption of an optically thin medium we write $$e^{i\Phi} = 1 + i\Phi \tag{28}$$

then we obtain from equation 26

$$E_o = E_T - i\Phi\, (R/T)\, E_T + G\nu \tag{29}$$

where the second term on the right is retained in the lowest order approximation due to the generally large value of R/T. Equation 29 embodies the operative relationship between the light presented to the cavity and that transmitted by it. Although equation 29 relates to field amplitudes, the same qualitative relationship exists between the inpinging and transmitted intensities. While we have considered only absorption, in general the $\nu$ that appears in equation 29 is complex and reflects both the dispersive and absorptive nature of the nonlinear medium. Further analysis of equation 29 will reveal both bistable and amplifying characteristics, either absorptive or primarily dispersive in origin.

Figure 2:
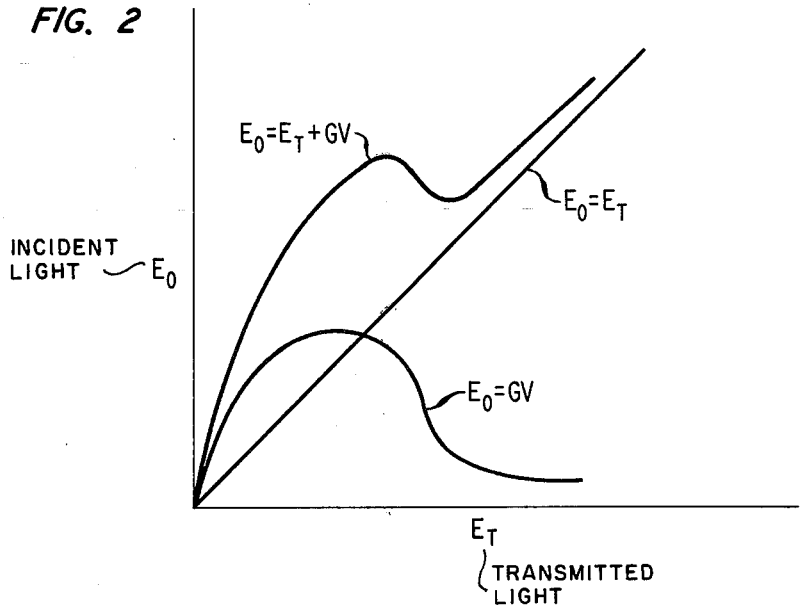
FIGS. 2 and 3 are graphical representations of the contributions of the various nonlinear phenomena to bistability.
Figure 3:
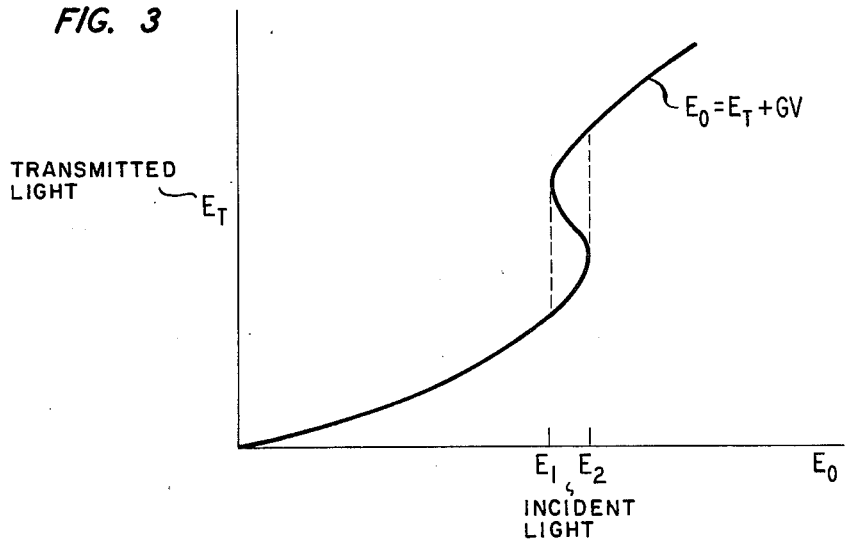
Figure 4:
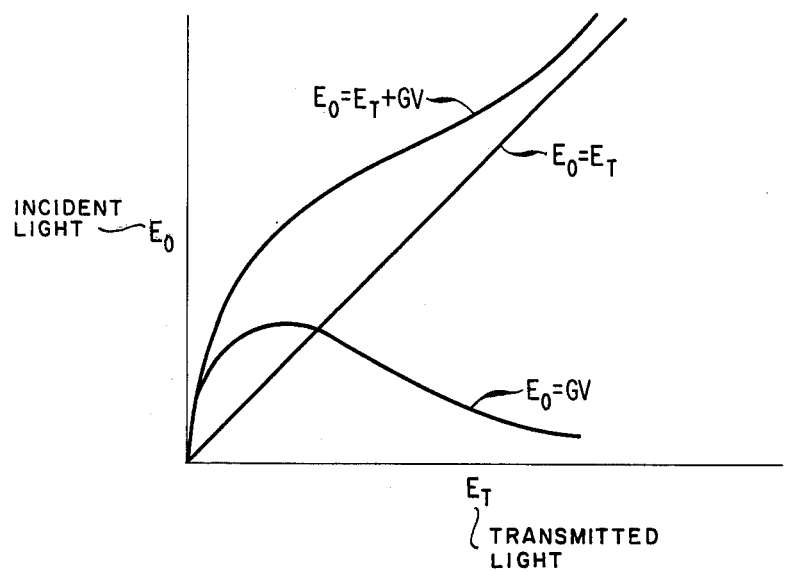
FIGS. 4 and 5 are graphical representations of the various nonlinear phenomena to single valued amplification.
Figure 5:
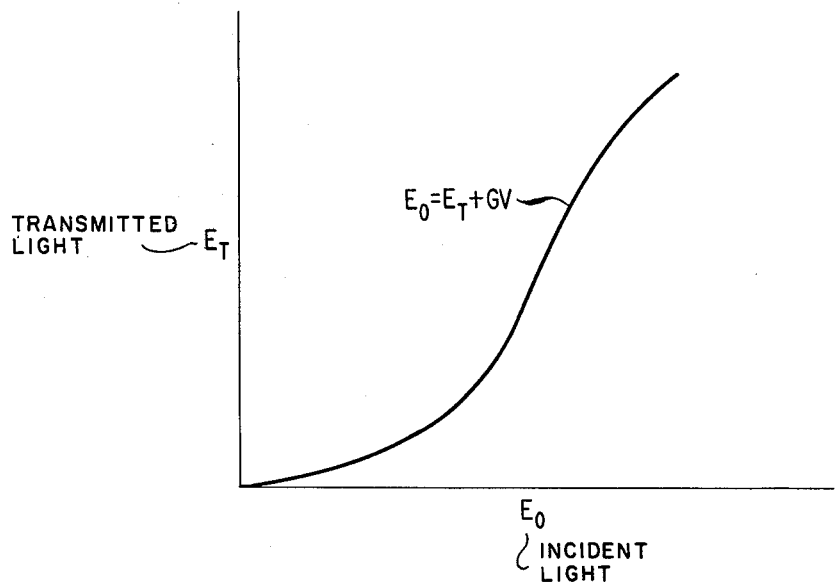

To simplify the discussion of equation 29 consider that $\nu$ is real and totally absorptive, and $\Phi = 0$. It is known that $\nu$ can be a function of intensity and hence of $E_o$. In FIG. 2, the general behavior of G $\nu$ is graphed on coordinates of $E_o$ versus $E_T$. Equation 29, neglecting the $\Phi$ term, is also displayed in this figure. In FIG. 3 equation 29 is displayed with the ordinate and abscissa interchanged. In the region between $E_1$ and $E_2$ the curve is multivalued and bistability results as described by Seidel and Szoke. However, as a direct result of the insights disclosed in this specification, it is apparent that G $\nu$ can be varied to alter the shape of the output curve. So, for example, in FIG. 4, G $\nu$ is varied so that the resultant output curve displayed in FIG. 5 is single valued and with a region of gain. It bears emphasizing that although these results are in terms of the electromagnetic fields, the same qualitative relationships exist between the various intensities. If $\Phi$ is nonzero, reflecting the fact that the cavity is detuned when empty, an additional term is available which one may vary to obtain amplifying characteristics in the output curve. Furthermore in general $\nu$ is complex and includes the dispersive qualities of the medium which may also be altered to control the output characteristics of the cavity. One necessary characteristic of this invention is that the nonlinear medium is a positive-temperature medium. A positive temperature medium is one which lacks a population inversion of the kind necessary for laser action.

Practice of the Invention

While the above equations are adequate for demonstrating the amplifying and bistable phenomena associated with a cavity enclosed nonlinear medium, the practice of the invention would, in most instances include solving more accurate equations. Such equations are described in part in the article by S. L. McCall Jr. which appeared in the April 1974 (Vol. 9 No. 4) issue of

*The Physical Review* at page 1522. In this reference the more exact equations describing the intracavity fields are given by $$\delta E_F/\delta Z = \sigma(o) E_F + \sigma(2K) E_B$$

$$\delta E_B/\delta Z = -\sigma(o) E_B - \sigma(-2K) E_F \qquad (30)$$

These equations are obtained by solving Maxwell's equations subject to the constraints imposed by the nonlinear medium. The $\sigma$'s reflect the nonlinear characteristics of the medium. Unlike the equations in the above-referenced article, here the quantities in equation 30 must be considered complex in order to include both absorptive and dispersive phenomena.

In the practice of the invention equation 30 is combined with the boundary conditions dictated by the cavity and an expression is obtained for the transmitted intensity in terms of the incident intensity. This relationship which, in general, will not be analytical is given by $$I_T = F(I_\sigma, M, C) \qquad (31)$$

Here F indicates a detailed functional relationship, $I_o$ and $I_T$ are the incident and transmitted intensities respectively, and are given by the absolute value of their associated fields squared, and M and C are medium and cavity dependent parameters respectively. The full solution represented by equation 31 is multidimensional and depends on the parameters $I_o$, M and C. However, according to the teachings and practice of this invention there are particular values of these parameters for which equation 31 will be single valued and with a region of differential gain. The solution of the above equations according to these teachings will display regions of primarily absorptive or primarily dispersive gain, regions of combined absorptive and dispersive gain, and similar regions of bistability, all dependent on the range of parameters $I_o$, M and C. The solution of the appropriate equations and the determination and selection of the subset which would satisfy the requirements of this invention is obvious, in the light of this disclosure, to those skilled in the art.

This specification then discloses, that in addition to the previously disclosed bistable characteristics which rely on the purely absorptive properties of a nonlinear medium enclosed in a cavity, other significantly broader modes of operation are possible. Accordingly, bistability and amplification associated with both dispersive and absorptive characteristics of the medium can form the basis for new functional devices. The properties of the medium and the cavity may be altered to provide for bistable or single-valued-amplifying modes of operation, either absorptive or dispersive in origin, or a combination thereof. Properties which may be so varied include the density of the medium, its length, its temperature, impurity levels of the medium, the separation of the mirrors and their relative orientation, the orientation, polarization, intensity and frequency of the light entering the cavity, as well as the introduction of more than one beam of light into the cavity. It is apparent that the nature of the nonlinear medium whether gas, liquid, or solid is immaterial as long as it has properties of sufficient flexibility so that the requisite output characteristics obtain. In both absorptive and dispersive modes the empty cavity need not be tuned to resonance. The cavity may be formed of any material of adequate reflectivity. While the frequency may be anywhere in the electromagnetic spectrum depending on the medium, the invention will most likely be practiced in the optical region by which is meant the ultraviolet (500 Angstroms-4500 Angstroms) infrared (7500 Angstroms-25$\mu$) or visible (4500 Angstroms-7500 Angstroms).

Figure 6:
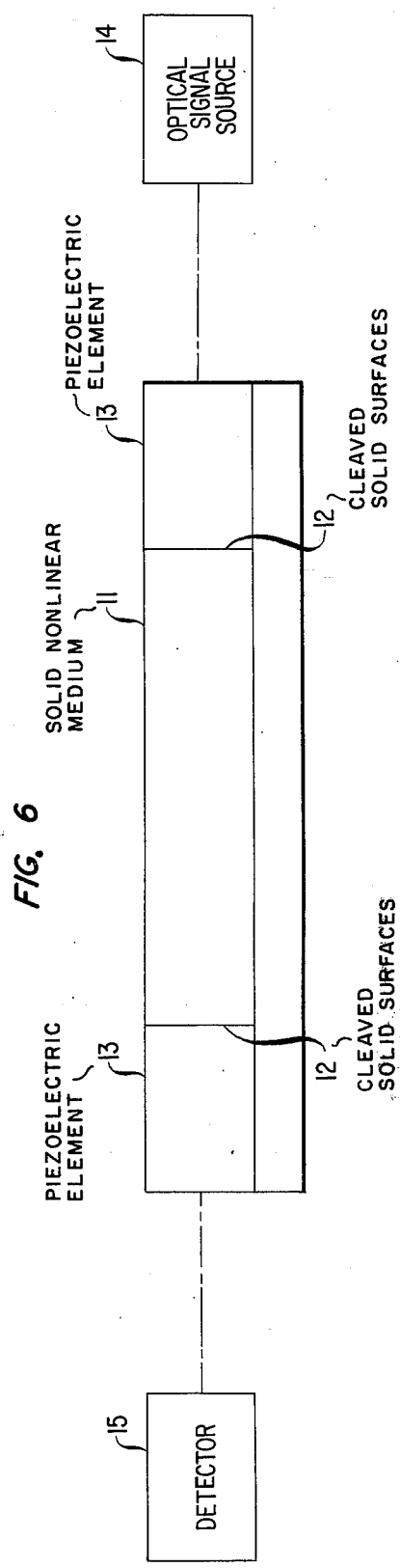
FIG. 6 is a representation of the device with a solid nonlinear medium.

The most practical embodiment of this invention will involve a solid nonlinear material, with cleaved ends to form reflecting surfaces and advantageously coated to increase reflectivity. For the dispersive devices representative materials are those with $|n_2| > 10^{-13}$ cm$^2$/statvolt$^2$ where $n_2$ is the coefficient of the term in the field dependent refractive index which is quadratic in field. A device with a solid nonlinear medium is shown in FIG. 6. Here 11 is the solid nolinear medium. The cleaved and coated ends are indicated by 12. One parameter that may be varied to fix the operating range is the medium length. Peizo-electric or electro-optic phenomena may be used for this purpose and such devices are represented by 13. The signal source is represented by 14 and the detector by 15.

Nonlinear semiconductor materials may be used as the solid medium. So, for example, InSb may be used for both dispersive amplification and bistability at an input wavelength of 10.8 microns. The operating range is controlled by altering its length or free carrier concentration. $N_2$ doped GaP maintained at reduced temperatures will display absorptive amplification. In either of these devices the cavity walls may be curved to increase the intracavity light density.

Once one has at their disposal an optical amplifier of the type described above, one may perform many functions in direct analogy with the more familiar electronic amplifiers. These include but are not limited to simple a.c. amplification, clipping, limiting, discrimination and positive and negative feedback.

Specific Embodiment

Figure 7:
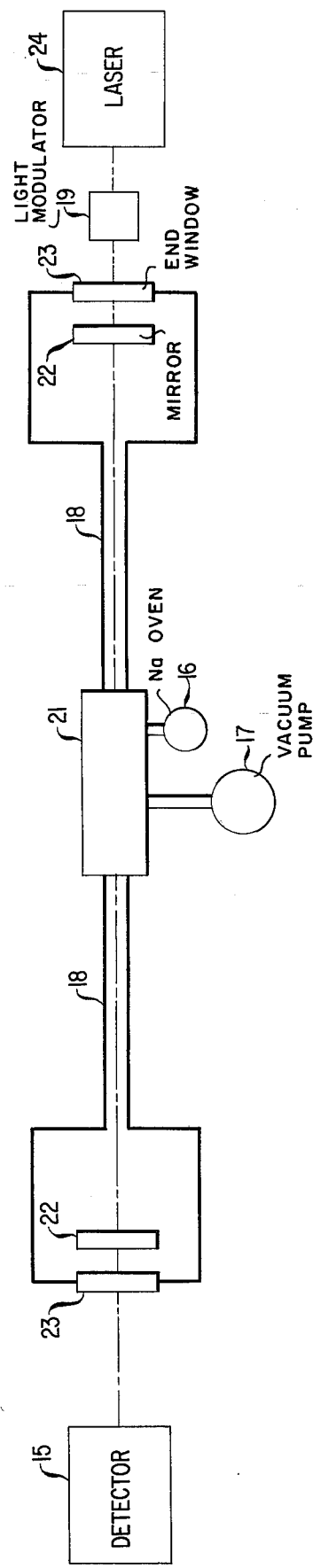
FIG. 7 is a schematic representation of a specific embodiment in which gaseous Na is the nonlinear medium.

For reasons of experimental expediency the first observations of optical bistability and differential gain were made with a Fabry-Perot interferometer (FP) containing sodium vapor and irradiated by the output of a frequency stabilized cw dye laser. This apparatus is shown in FIG. 7. The 50 mW single mode dye laser, 24, was stabilized by locking it to an evacuated high-finesse FP (less than 100 MHz drift per hour). The dye laser was tuned by tilting and/or heating the 1 cm etalon. Absolute frequencies were determined by saturation spectroscopy. The optical beam traversed an acousto-optic modulator, 19, which varied the intensity at audio frequencies, reduced the 10 percent dye laser amplitude jitter to 1 or 2 percent by feedback control, and eliminated optical feedback from the device to the dye laser by downshifting the return beam by 80 MHz. The optical beam incident on the optical amplifying device had a diameter of about 1.65 mm and a maximum power of 13 mW. The device consisted of a FP with 90 percent reflecting mirrors, 22, joined with end windows, 23, of an 11 cm long evacuated region. The central 2.5 cm length, 21, contained Na vapor at a typical pressure of $10^{-5}$ to $10^{-4}$Torr. (Condensation of Na on the mirrors was impeded by 0.6 cm dia., 4 cm long tubes with bellows, 18, connecting the stainless steel Na cell to the mirrors). The transmitted and incident intensities were monitored by photomultipliers, 15, and displayed as the vertical and horizontal deflections on an oscilloscope. The Na oven is represented by 16, and 17 represents the necessary vacuum apparatus.

At the time bistability was first seen we attributed it to nonlinear absorption, with the hysteresis upon lowering the intensity resulting from the large intracavity intensity keeping the absorption saturated for intensities below the turn-on intensity, as previously discussed. Although the Doppler effect in Na was expected to greatly reduce the bistability, the data indicated strong bistability. In further disagreement with the absorptive model, the characteristic curve changed differently when the FP plate separation was increased or decreased from optimum bistability separation. The FP asymmetry clearly indicated the importance of dispersion to optimum bistability in Na. By scanning the laser frequency across the $D_2$ line of Na, it was found that asymmetry (and bistability) vanished and changed signs at three frequencies; about 400 MHz below the transitions from the ground state $F = 2$, at the crossover halfway between $F = 1$ and $F = 2$, and about 300 MHz above $F = 1$. It was then calculated that at these three frequencies the dispersion has no nonlinear properties. At the lowest frequency, purely absorptive bistable operation has been seen by using maximum power and high absorption. We believe that this constitutes the first clear demonstration of the previously predicted absorptive bistability. In other spectral regions combined absorptive and dispersive, or primarily dispersive, nonlinearity, bistability or gain could be observed depending on the medium density and the optical frequency. These conditions are summarized in Table I.

Table I

| Mode | Incident Freq. | Temp C | Pressure (Torr) |
|---|---|---|---|
| Absorptive Bistability | $F = 2, - 400$ MHz | $205 \pm 20$ | $2 \times 10^{-4}$ |
| Dispersive Bistability | $F = 2, + 150$ MHz | $195 \pm 20$ | $10^{-4}$ |
| Absorptive Gain | $F = 2, - 400$ MHz | $195 \pm 20$ | $10^{-4}$ |
| Dispersive Gain | $F = 1, - 100$ MHz | $185 \pm 20$ | $6 \times 10^{-5}$ |

In column two F refers to the hyperfine line of the $D_2$ transition in Na at 5890 Angstroms. In the case of dispersive bistability the dispersion effect dominates.

What is claimed is:

1. A method of amplifying variations in an optical signal of a given wavelength comprising introducing light of the given wavelength into a cavity formed by at least two surfaces that reflect light of the given wavelength, and which surfaces are separated at least in part by a positive-temperature nonlinear medium fixing the cavity and medium characteristics such that the absorptive properties of the medium dominate its dispersive properties and such that there is a single valued relationship between the intensities of the incident and transmitted signals which exhibits gain, and extracting the amplified signal from said cavity.

2. The method of claim 1 where the cavity and medium characteristics are determined by combining the intracavity equations $$\delta E_F/\delta Z = \sigma(o)E_F + \sigma(2K) E_B$$

$$\delta E_B/\delta Z = - \sigma(o)E_B - \sigma(-2K) E_F$$

with the cavity boundary conditions, to yield a single-valued input-output characteristic curve that exhibits gain.

3. The method of claim 2 where the cavity is a Fabry-Perot cavity.

4. The method of claim 2 where the light wavelength is greater than 4500 Angstroms and less than or equal to 7500 Angstroms.

5. The method of claim 2 where the light wavelength is greater than 7500 Angstroms and less than or equal to 25 microns.

6. The method of claim 2 where the light wavelength is greater than 500 Angstroms and less than or equal to 4500 Angstroms.

7. The method of claim 2 where the wavelength is such that the medium is primarily dispersive, and has a value of $|n_2| > 10^{-13}$ cm$^2$/statvolt$^2$.

8. The method of claim 2 where the wavelength is such that the medium is primarily absorptive.

9. The method of claim 2 where the medium conditions are fixed by introducing additional light beams into the cavity.

10. The method of claim 7 where the medium is Na.

11. The method of claim 7 where the nonlinear medium is a solid.

12. The method of claim 11 where the medium is InSb.

13. A device to amplify variations in optical signals of a given wavelength comprising a cavity formed by at least two surfaces that reflect light of the given wavelength together with means for introducing light into, and extracting light from, the cavity and which surfaces are separated at least in part by a positive-temperature nonlinear medium, which separation is of such a value and which medium is maintained under such conditions, that the absorptive properties of the medium dominate its dispersive properties and that there is a single valued relationship between the intensity of the signal of said wavelength impinging on and emitted by the said device that displays gain.

14. The device of claim 13 where the cavity and medium characteristics are determined by combining the intracavity equations $$\delta E_F/\delta Z = \sigma(o)E_F + \sigma(2K) E_B$$

$$\delta E_B/\delta Z = -\sigma(o)E_B - \sigma(-2K) E_F$$

with the cavity boundary conditions, to yield a single valued input-output characteristic curve that exhibits gain.

15. The device of claim 14 where the cavity is a Fabry-perot cavity.

16. The device of claim 14 where the light wavelength is greater than 4500 Angstroms and less than or equal to 7500 Angstroms.

17. The device of claim 14 where the light wavelength is greater than 7500 Angstroms and less than or equal to 25 microns.

18. The device of claim 14 where the light wavelength is greater than 500 Angstroms and less than or equal to 4500 Angstroms.

19. The device of claim 14 where the medium is primarily dispersive at the said wavelength and has a value of $|n_2| > 10^{-13}$ cm$^2$/statvolt$^2$.

20. The device of claim 14 where the medium is primarily absorptive at the said wavelength.

21. The device of claim 14 where the medium conditions are fixed by introducing additional light beams into the cavity.

22. The device of claim 19 where the medium is Na.

23. The device of claim 19 where the nonlinear medium is a solid.

24. The device of claim 23 where the medium is InSb.

* * * * *

UNITED STATES PATENT AND TRADEMARK OFFICE
CERTIFICATE OF CORRECTION

PATENT NO. : 4,071,831
DATED : January 31, 1978
INVENTOR(S) : Samuel L. McCall, Jr.

It is certified that error appears in the above-identified patent and that said Letters Patent are hereby corrected as shown below:

Under inventors delete names "Hyatt McDonald Gibbs" and "Thirumalai Nallan Chakravarthy Venkatesan" from patent as coinventors.

Column 1, line 52, "vaible" should be --viable--.
Column 2, line 26, "mirros" should be --mirrors--.
Column 4, line 44, "√T" should be $--\sqrt{T}--$;
         line 46, "√R" should be $--\sqrt{R}--$;
         line 66, "√T" should be $--\sqrt{T}--$,
                  "√R" should be $--\sqrt{R}--$.
Column 5, line 6, "Z = 0" should be --Z = o--;
         line 51, "$E_B$" should be --$E_F$--.
Column 6, line 12, "=" should be --≃--;
         line 16, "=" should be --≃--,
                "(R/T)" should be $--\frac{R}{T}--$.

Signed and Sealed this

Fifteenth Day of August 1978

[SEAL]

Attest:

RUTH C. MASON
Attesting Officer

DONALD W. BANNER
Commissioner of Patents and Trademarks